United States Patent [19]

Kloster

[11] Patent Number: 4,679,780
[45] Date of Patent: Jul. 14, 1987

[54] SPRING COMPRESSOR WITH LATCHABLE LOCKING DEVICE

[76] Inventor: Kenneth D. Kloster, 6649 Millridge, Maumee, Ohio 43537

[21] Appl. No.: 646,622

[22] Filed: Aug. 31, 1984

Related U.S. Application Data

[63] Continuation-in-part of Ser. No. 565,137, Dec. 27, 1983, abandoned, which is a continuation of Ser. No. 473,720, Mar. 16, 1983, abandoned, which is a continuation of Ser. No. 242,283, Mar. 10, 1981, abandoned.

[51] Int. Cl.4 .............................................. F16F 1/10
[52] U.S. Cl. ................................ 267/177; 24/241 SL; 29/227; 267/61 S; 403/328; 403/DIG. 6
[58] Field of Search ...................... 267/61 S, 166, 167, 267/175, 177; 29/227; 24/238, 241 R, 241 SL; 403/328, DIG. 6, DIG. 7, DIG. 8

[56] References Cited

U.S. PATENT DOCUMENTS

| | | | |
|---|---|---|---|
| 1,198,139 | 9/1916 | Lyon | 24/241 SL |
| 2,385,709 | 9/1945 | Johnston | 24/238 |
| 3,602,538 | 8/1971 | Canter | 403/328 X |
| 4,034,960 | 7/1977 | Kloster | 29/227 X |
| 4,061,308 | 12/1977 | Ghent | 29/227 X |
| 4,219,918 | 9/1980 | Klann | 29/227 |

FOREIGN PATENT DOCUMENTS

| | | | |
|---|---|---|---|
| 295177 | 12/1953 | Switzerland | 24/238 |
| 1348906 | 3/1974 | United Kingdom | 29/227 |

*Primary Examiner*—George E. A. Halvosa
*Attorney, Agent, or Firm*—Marshall & Melhorn

[57] ABSTRACT

The present invention relates to a tool for compressing a helical spring of the type typically used in a MacPherson strut suspension system. The tool comprises a pair of spaced apart shoes each having a helical groove formed therein for engaging a portion of the coil of the spring. Each shoe also includes a latchable locking device extendible over the respective helical groove for maintaining the coil of the spring within the groove during the compression operation. The two shoes are maintained in a spaced apart relationship with the associated grooves in facing relationship to one another by a threaded shank member. The threaded shank member includes a separate tool engaging configuration on each end thereof and is employed to effect movement of the spaced apart shoes toward and away from one another during the operation of the tool.

3 Claims, 8 Drawing Figures

SPRING COMPRESSOR WITH LATCHABLE LOCKING DEVICE

CROSS REFERENCE TO RELATED APPLICATION

This application is a continuation-in-part application of my copending application Ser. No. 565,137, filed Dec. 27, 1983, which application is a continuation of application Ser. No. 473,720, filed Mar. 16, 1983, which application is a continuation of application Ser. No. 242,283, filed Mar. 10, 1981, all now abandoned.

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact component of a vehicle suspension system. The MacPherson strut suspension system is disclosed in more detail in U.S. Pat. No. 2,624,592 to E. S. MacPherson.

One of the problems associated with MacPherson strut assemblies is related to the replacement of a worn shock absorber unit. One solution to this problem is to manufacture the MacPherson strut assembly with a construction which permits the shock absorber to be readily removed and replaced with a new shock absorber. However, such a repair procedure can be relatively time consuming, since typically the strut assembly must be removed from the vehicle.

One solution to reducing the time associated with repairing a MacPherson strut assembly is disclosed in U.S. Pat. No. 4,034,960 to K. D. Kloster. The Kloster patent discloses a pneumatic operated spring compressor which can be utilized to repair a strut assembly while the lower portion of the assembly remains attached to the vehicle. However, the economics of such a compressor can typically only be justified by repair shops which frequently repair strut suspension systems.

Smaller repair shops typically utilize a relatively inexpensive spring compressor unit of the type manufactured by Warren, Inc. of Jonesboro, Ark. This type of spring includes a pair of spaced apart U-shaped hooks which are maintained in a facing relationship by means of an elongate bolt. In operation, typically two or three of the compressor units are circumferentially spaced about the coil spring and the bolts are alternately tightened to move the U-shaped hooks towards one another, thereby compressing the spring. However, one of the problems associated with this type of spring compressor is that the U-shaped hooks do not provide a good seating relationship with the helical coil of the spring which may lead to twisting and misalignment of the spring compressor. Such twisting or misalignment may result in the dangerous condition of causing the compressor hooks to become dislodged from the spring and inflict injury upon the operator.

SUMMARY OF THE INVENTION

The present invention relates to a tool for compressing the helical spring of the type typically utilized in a MacPherson strut suspension system. The tool comprises a pair of spaced apart shoes each having a helical groove formed therein for engaging a portion of the coil of the spring. Such an arrangement includes a shoe having a bearing surface in contact with the spring coil which tends to militate against any twisting or misalignment of the spring compressor during the compression operation. Each shoe also includes a latchable locking means extendible over the helical groove for maintaining the coil of the spring within the groove during the compression operations. Consequently, even if the shoe would become misaligned, the latchable locking means prevents the spring compressor from becoming dislodged from the spring.

The pair of shoes are maintained in a spaced apart relationship with the associated grooves in facing relation to one another by means of a threaded shank member. The threaded shank member includes tool engaging means on each end thereof and is employed to effect movement of the spaced apart shoes toward and away from one another during the operation of the tool.

Accordingly, it is an object of the present invention to provide a relatively economical spring compressor which can effectively and safely be employed to compress a helical coil spring.

BRIEF DESCRIPTION OF THE DRAWINGS

The above, as well as other objects and advantages of the invention, will become readily apparent to one skilled in the art from reading the following detailed description of the invention when considered in light of the accompanying drawings, in which.

DESCRIPTION OF THE PREFERRED EMBODIMENT

Figure 1:
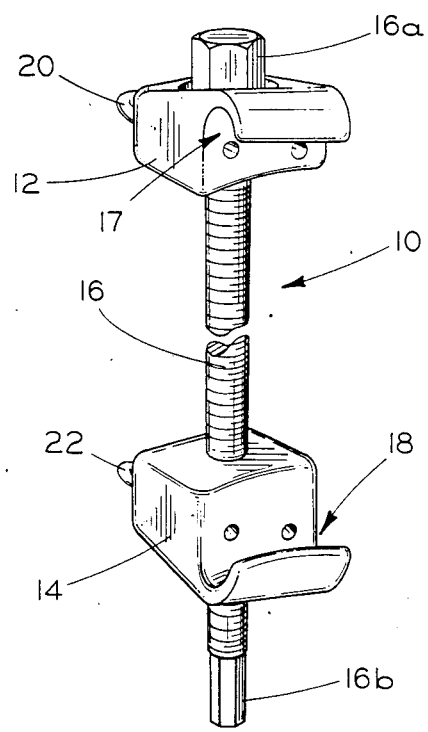
FIG. 1 is a perspective view of a spring compressor embodying the features of the present invention.
Figure 2:
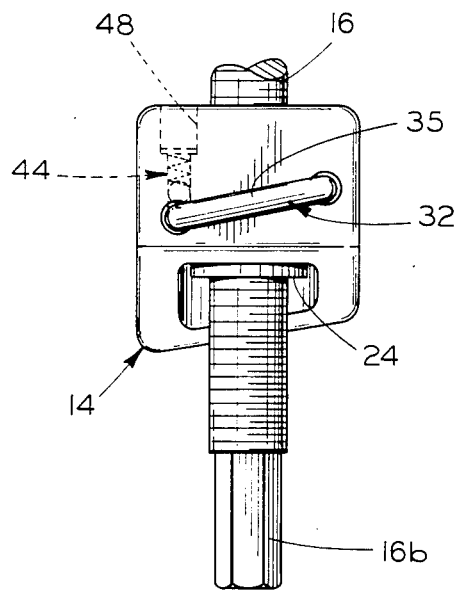
FIG. 2 is a rear elevational view of the lower shoe of the compressor of FIG. 1.

Referring to FIG. 1, there is shown a spring compressor generally indicated by reference numberal 10 embodying the features of the present invention. The compressor 10 includes an upper shoe 12 and a lower shoe 14 which are maintained in a spaced apart relationship by an elongate threaded shank 16. The shank 16 is provided with an upper tool engaging portion 16a and a lower tool engaging portion 16b. The shoes 12 and 14 have helical grooves 17 and 18 formed therein for receiving a portion of the coil spring to be compressed. The shoes 12 and 14 also have latchable locking means 20 and 22, respectively, mounted thereon which are extendible to a locked position across the respective grooves to maintain the coil within the groove during the compression operation. The locking means can be moved to a retracted position when it is desired to remove the coil from the associated groove.

Referring to FIGS. 2 through 6, there are shown more detailed drawings illustrating the features of the lower shoe unit 14. Except for an internally threaded bushing 24 which is centrally located within the shoe 14 to receive the one end of the threaded shank 16, the lower shoe 14 is basically identical to the upper shoe 12. The upper shoe is provided with a central bore hole 12a for rotatably receiving an upper cylindrical shoulder portion 16c of the shank 16. A thrust washer 15 is positioned between the shank head 16a and an upper machined surface 12b of the shoe 12. Both shoes can be, for example, aluminum castings.

Figure 3:
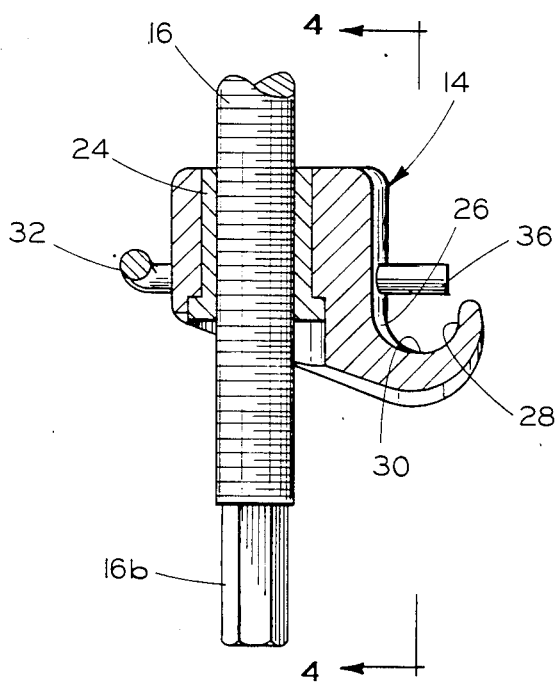
FIG. 3 is a sectional view taken along the line 3—3 of FIG. 2.
Figure 4:
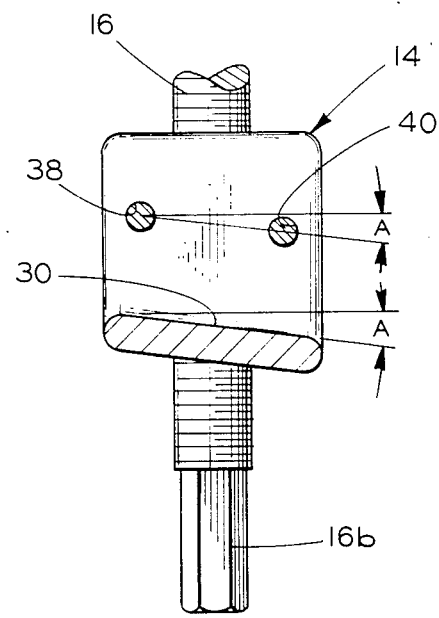
FIG. 4, is a sectional view taken along line 4—4 of FIG. 3.
Figure 5:
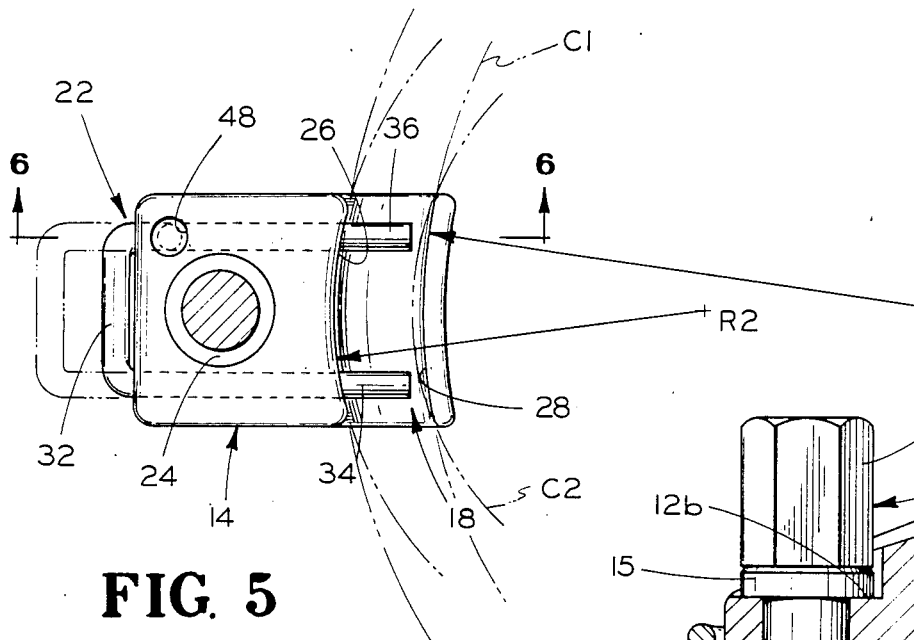
FIG. 5 is a top elevational view of the shoe shown in FIG. 3.
Figure 7:
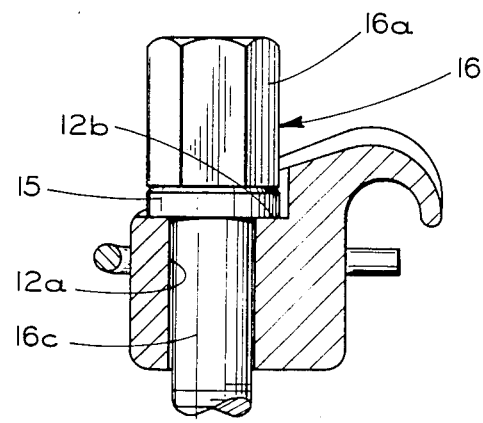
FIG. 7 is a sectional view of the upper spring shoe of the compressor of FIG. 1.

As previously mentioned, the groove 18 is formed with a helical configuration. This type of construction provides an increased bearing surface for engagement with the coil of the spring, thereby militating against any twisting of the shoe 14 during the compression of the spring. As shown in FIGS. 3 through 5, the groove 18 is defined by arcuately formed sidewalls 26 and 28 and a lower inclined surface 30. As shown in FIG. 4, the lower inclined surface 30 is formed at an angle A with respect to a plane perpendicular with the longitudinal axis of the threaded shank 16. It has been found that an angle A of approximately 7° provides a medium angle which accommodates most large helical springs.

As shown in FIG. 5, the arcuate sidewall 28, which is adapted to face the inside portion of a helical coil, is formed of a radius R1 corresponding to the inside diameter of the largest spring (represented by coil C1) to be compressed. On the other hand, the arcuate sidewall 26, which is adapted to face the outside portion of a helical coil, is formed of a radius R2 corresponding to the outside diameter of the smallest spring (represented by coil C2) to be compressed. Thus, the sidewall 26 has a greater curvature than the sidewall 28. The arcuate sidewalls 26 and 28 of the groove 18 are spaced apart sufficiently so as to encompass the expected size ranges of springs. The groove 17 of the upper shoe 12 is formed in a similar manner to the groove 18.

The latchable locking means 22 includes a U-shaped member 32 formed from a steel rod and having a pair of parallel legs 34 and 36 which extend into parallel apertures 38 and 40, respectively, formed in the shoe 14. The inner ends of the legs 34 and 36 are connected by a connecting member 35. As shown in FIG. 4, the apertures 38 and 40 are formed at the same angle A as the groove 18. The U-shaped member 32 is maintained in either a locked or retracted position by means of a detent assembly 44 located in an aperture 48 formed in the shoe 14. The aperture 48 is generally perpendicular to and intersects the aperture 40.

Figure 6:
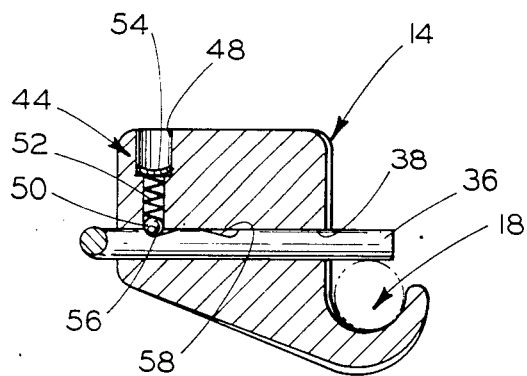
FIG. 6 is a sectional view taken along the line 6—6 of FIG. 5.

As shown in FIG. 6, the detent assembly 44 includes a ball 50, a spring 52, and a locking washer 54, which are mounted within the aperture 48. The spring 52 urges the ball 50 downwardly into either a locking detent 56 or a retracted detent 58 formed in the leg 36. The latchable locking means 20 of the upper shoe 12 is similar to the locking means 22.

When the U-shaped member 32 is pushed inwardly, as shown in FIG. 5, the outer ends of the legs 34 and 36 will protrude from the apertures 38 and 40, respectively, and extend outwardly across the top of the groove 18. At this time, the ball 50 will be seated within the detent 56 to maintain the locking member 32 in the locked position. The locking member 32 can be moved to a retracted position, as illustrated in phantom in FIG. 5, by pulling outwardly on the member 32 such that the ball 50 will be momentarily moved upward and then seat within the detent 58.

Figure 8:
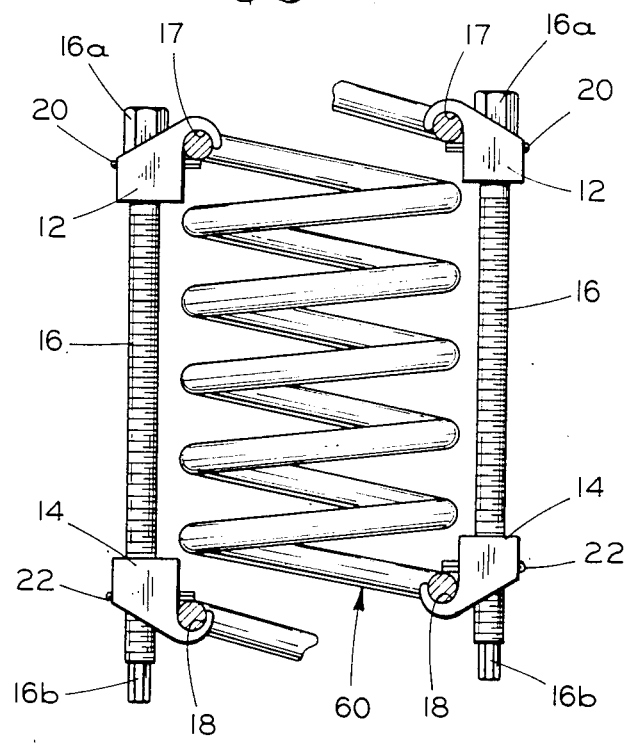
FIG. 8 is an elevational view of a helical coil spring having a pair of spring compressors according to the present invention positioned thereon.

FIG. 8 illustrates the general operational position of the spring compressing tool 10. Typically, at least two spring compressors 10 are utilized to compress a single coil spring 60. In positioning the compressors 10 on the spring 60, the locking means 20 and 22 are moved to the retracted position while the end coils of the spring 60 are seated within the grooves 17 and 18. Next, the locking means 20 and 22 are moved to the locked position in order to secure the shoes 12 and 14 of the coil. A suitable wrench (not shown) can then be utilized to engage the upper tool engaging portion 16a provided at the upper end of the shanks 16 and alternately rotate the shanks 16 to cause the lower and upper shoes to move toward one another, thereby compressing the spring 60. In instances wherein the upper tool engaging portion 16a is not easily accessible (for example, when a vehicle fender provides limited access to the upper end of the associated spring compressor), the lower tool engaging portion 16b can be used to rotate the bolt 16. As previously mentioned, the helical grooves 17 and 18 tend to militate against any twisting of the compressor 10 during the compression operation, while the locking means 20 and 22 will prevent the compressor 10 from being dislodged from the spring.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope.

What is claimed is:

1. A spring compressor for compressing a helical coil spring comprising:
   a pair of spaced apart shoes each having a groove formed therein for receiving a portion of the helical coil of the spring;
   at least one of said shoes having said groove formed of a helical configuration, and said groove defining a spring engaging bottom wall located in a plane formed at a predetermined, non-perpendicular angle with respect to a compression axis;
   an elongate threaded shank parallel to said compression axis for mounting said shoes in spaced apart relationship with said grooves in facing relationship to one another, said shank having one end thereof rotatably supported by one of said shoes and having an opposite threaded end for threaded engagement with the other one of said shoes whereby rotation of said shank in one direction relative to said other one of said shoes causes said pair of spaced apart shoes to move toward one another; and
   a latchable locking means carried by at least one of said shoes, said locking means including a U-shaped member having a pair of spaced apart, generally parallel legs extending through apertures formed in said shoe on opposite sides of said elongate shank, said legs having first ends connected by a connecting member and having second ends adapted to extend over said groove, said legs being located in a plane substantially parallel to said angled spring engaging bottom wall such that each of said second ends is spaced from said bottom wall by substantially the same distance, said U-shaped member being movable between a retracted position wherein said outer ends of said legs are positioned within said shoe and said portion of the helical coil spring can be inserted into said groove and a locked position wherein said second ends of said legs extend over said groove and over said portion of the helical coil, said groove and said legs cooperating to substantially surround said portion of the helical coil for maintaining said portion of the helical coil within said groove, and detent means carried by one of said shoes and positioned to engage one of said legs for maintaining said U-shaped member in either the locked position or the retracted position.

2. An apparatus according to claim 1 wherein at least one of said shoes includes a pair of spaced apart generally arcuate sidewalls defining said coil receiving grooves, one of said sidewalls defining a first radius and adpated to face an inside portion of helical coil, the other one of said sidewalls defining a second radius less than said first radius and adapted to face an outer portion of the helical coil.

3. An apparatus according to claim 1 wherein said elongate threaded shank includes a separate tool engaging means formed on each end thereof.

* * * * *